US011161477B2

United States Patent
Chen et al.

(10) Patent No.: US 11,161,477 B2
(45) Date of Patent: Nov. 2, 2021

(54) DOOR HANDLE, VEHICLE LOCK CONTROL SYSTEM INCLUDING THE SAME, AND OPERATION METHOD OF THE VEHICLE LOCK CONTROL SYSTEM

(71) Applicants: HU SHAN AUTO PARTS INC., New Taipei (TW); INVENTEC BESTA CO., LTD., Taipei (TW)

(72) Inventors: Ying-Chih Chen, New Taipei (TW); Jen-Chien Chang, New Taipei (TW); Ching-Chaing Tsai, Taipei (TW)

(73) Assignees: HU SHAN AUTO PARTS INC., New Taipei (TW); INVENTEC BESTA CO., LTD., Taipei (TW)

( * ) Notice: Subject to any disclaimer, the term of this patent is extended or adjusted under 35 U.S.C. 154(b) by 40 days.

(21) Appl. No.: 16/827,641

(22) Filed: Mar. 23, 2020

(65) Prior Publication Data
US 2020/0307517 A1 Oct. 1, 2020

(30) Foreign Application Priority Data
Mar. 25, 2019 (TW) .................................. 108110219

(51) Int. Cl.
*B60R 25/24* (2013.01)
*B60R 25/30* (2013.01)
*B60R 25/01* (2013.01)

(52) U.S. Cl.
CPC ............ *B60R 25/241* (2013.01); *B60R 25/01* (2013.01); *B60R 25/30* (2013.01); *B60R 2325/105* (2013.01)

(58) Field of Classification Search
CPC . B60R 2325/105; B60R 25/01; B60R 25/241; B60R 25/30
See application file for complete search history.

(56) References Cited

U.S. PATENT DOCUMENTS

2011/0012378 A1* 1/2011 Ueno ...................... E05B 81/78
  292/336.3
2020/0011096 A1* 1/2020 Leonardi ................ E05B 81/76

FOREIGN PATENT DOCUMENTS

TW 200817215 A 4/2008

OTHER PUBLICATIONS

Search Report appended to an Office Action, which was issued to Taiwanese counterpart application No. 108110219 by the TIPO dated Jun. 18, 2019, with an English translation thereof.

* cited by examiner

*Primary Examiner* — Nader Bolourchi
(74) *Attorney, Agent, or Firm* — Hamre, Schumann, Mueller & Larson, P.C.

(57) ABSTRACT

A vehicle door handle including an RFID module and a button module cooperates with a vehicle controller and a remote control. The button module triggers the RFID module to transmit a querying code to the remote control upon being pressed. The remote control transmits a confirmation code and a remote ID code to the RFID module, and the RFID module determines whether the confirmation code corresponds to the querying code. If yes, the RFID module further forwards the remote ID code to the controller in order for the controller to determine whether the remote ID code is identical with a pre-stored ID code, and to control a lock actuator to switch from a locking position to an unlocking position, or vice versa, when it is determined that the remote ID code is identical with the pre-stored ID code.

17 Claims, 5 Drawing Sheets

DOOR HANDLE, VEHICLE LOCK CONTROL SYSTEM INCLUDING THE SAME, AND OPERATION METHOD OF THE VEHICLE LOCK CONTROL SYSTEM

CROSS-REFERENCE TO RELATED APPLICATION

This application claims priority to Taiwanese Invention Patent Application No. 108110219, filed on Mar. 25, 2019.

FIELD

The disclosure relates to a vehicle door handle, and more particularly to a vehicle door handle including a radio frequency identification (RFID) module.

BACKGROUND

Figure 1:
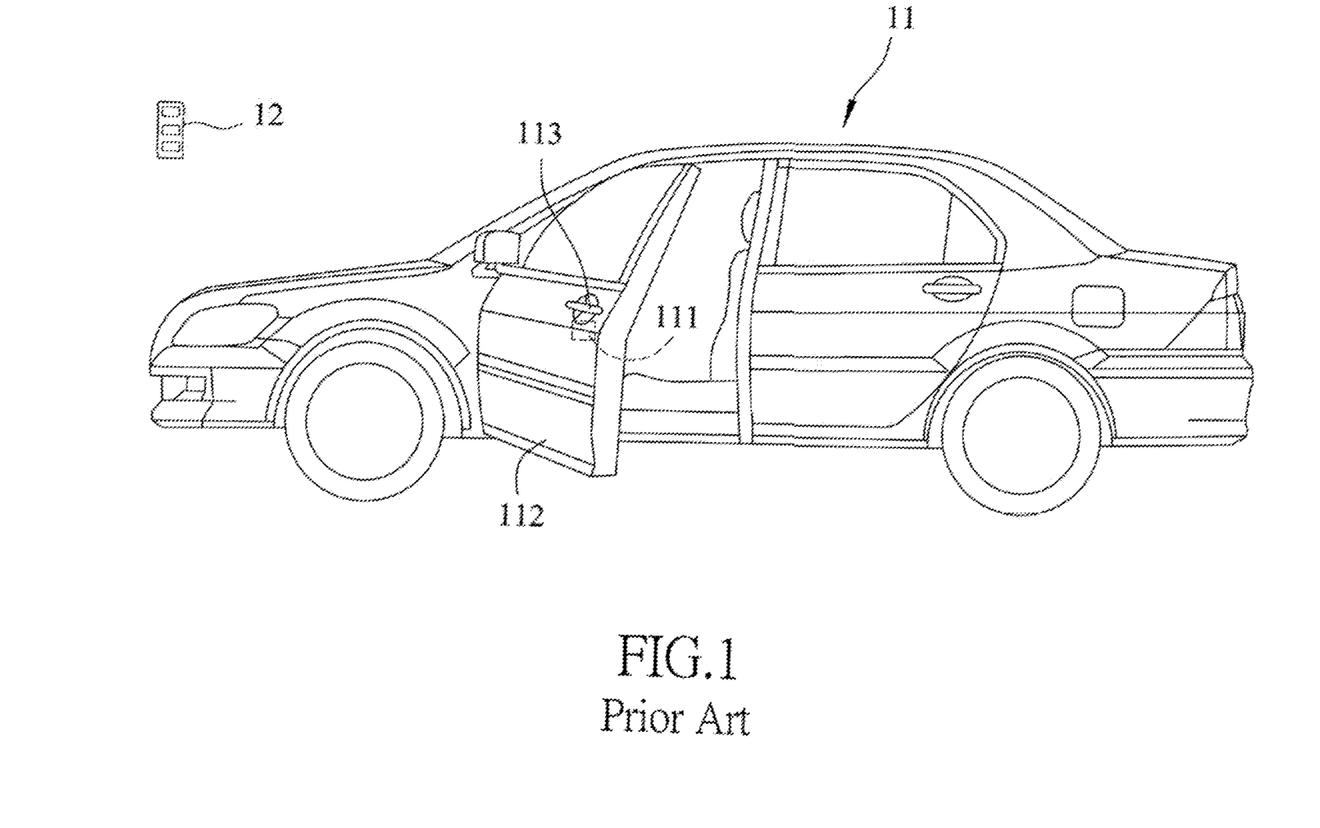
FIG. 1 is a schematic view illustrating a conventional vehicle lock control system.

Referring to FIG. 1, a conventional vehicle 11 includes a door 112, a door lock actuator 111, and a conventional vehicle door handle 113 that is mounted on the door 112 and is mechanically linked with the door lock actuator 111. A user may operate a remote control 12 to switch the door lock actuator 111 between a locking position and an unlocking position. The remote control 12 stores a unique security code for identification and authorization purposes. When the door lock actuator 111 is in the unlocking position, the door 112 can be opened by pulling the door handle 113.

However, a thief may surreptitiously record a carrier wave transmitted by the remote control 12 and carrying the unique security code during transmission of the carrier wave. An unauthorized remote control may be programmed to have the same carrier wave and unique security code so that the thief may unlock the door 112 of the vehicle 11 and even start the engine of the vehicle 11 using the unauthorized remote control.

SUMMARY

Therefore, an object of the disclosure is to provide a vehicle lock control system for a vehicle that can alleviate at least one of the drawbacks of the prior art.

According to the disclosure, the vehicle includes a door and a lock actuator switchable between a locking position and an unlocking position. The vehicle lock control system includes a controller configured to store a pre-stored identification (ID) code, a remote control storing a remote ID code, and a door handle adapted to be mounted on the door of the vehicle.

The door handle includes a handle body, a radio frequency identification (RFID) module, and a button module. The RFID module is disposed in the handle body, electrically connected to the controller, and configured to communicate with the remote control using RFID technology. The button module is disposed on the handle body, electrically connected to the RFID module, and configured to trigger the RFID module to generate and transmit a request signal including a querying code to the remote control upon being pressed.

The remote control is configured to transmit a confirmation code and the remote ID code to the RFID module after receiving the request signal, and the RFID module is further configured to determine whether the confirmation code corresponds to the querying code and to forward the remote ID code to the controller when it is determined that the confirmation code corresponds to the querying code.

The controller is configured to determine whether the remote ID code received from the RFID module is identical with the pre-stored ID code, and to control the lock actuator to switch from one of the locking position and the unlocking position to the other one of the locking position and the unlocking position when it is determined that the remote ID code is identical with the pre-stored ID code.

Another object of the disclosure is to provide a door handle that can alleviate at least one of the drawbacks of the prior art.

According to the disclosure, the door handle is adapted to be mounted on a door of a vehicle, and is configured to cooperate with a controller that is provided in the vehicle and that stores a pre-stored ID code, and a remote control that stores a remote ID code.

The door handle includes a handle body, an RFID module, and a button module. The RFID module is disposed in the handle body, electrically connected to the controller, and configured to communicate with the remote control using RFID technology. The button module is disposed on the handle body, electrically connected to the RFID module, and configured to trigger the RFID module to generate and transmit a request signal including a querying code to the remote control upon being pressed, in order for the remote control to transmit a confirmation code and the remote ID code to the RFID module after receiving the request signal.

The RFID module is further configured to determine whether the confirmation code corresponds to the querying code, to forward the remote ID code to the controller when it is determined that the confirmation code corresponds to the querying code, in order for the controller to determine whether the remote ID code received from said RFID module is identical with the pre-stored ID code, and to control the lock actuator to switch from one of the locking position and the unlocking position to the other one of the locking position and the unlocking position when it is determined that the remote ID code is identical with the pre-stored ID code.

Yet another object of the disclosure is to provide an operation method of a vehicle lock control system that can alleviate at least one of the drawbacks of the prior art.

According to the disclosure, the vehicle lock control system is for use in a vehicle that includes a door and a lock actuator switchable between a locking position and an unlocking position. The vehicle lock control system includes a controller storing a pre-stored ID code, a remote control storing a remote ID code, and a door handle mounted on the door. The door handle includes a handle body, an RFID module disposed in the handle body, and a button module electrically connected to the RFID module.

The method includes:
the RFID module generating and transmitting a request signal that includes a querying code to the remote control upon being triggered by the button module when the button module is pressed;
the remote control transmitting a confirmation code and the remote ID code to the RFID module after receiving the request signal;
the RFID module determining whether the confirmation code corresponds to the querying code and forwarding the remote ID code to the controller when it is determined that the confirmation code corresponds to the querying code;
the controller determining whether the remote ID code received from the RFID module is identical with the pre-stored ID code; and the controller controlling the lock actuator to switch from one of the locking position and the unlocking position to the other one of the locking position and the unlocking position when it is determined that the remote ID code is identical with the pre-stored ID code.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
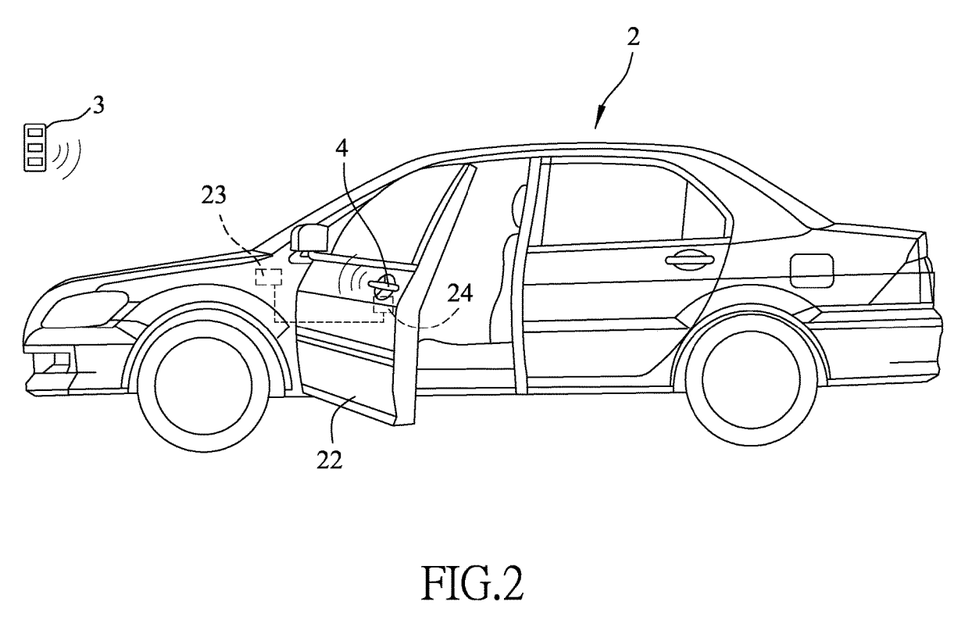
FIG. 2 is a schematic view illustrating an embodiment of a vehicle lock control system according to the disclosure.
Figure 3:
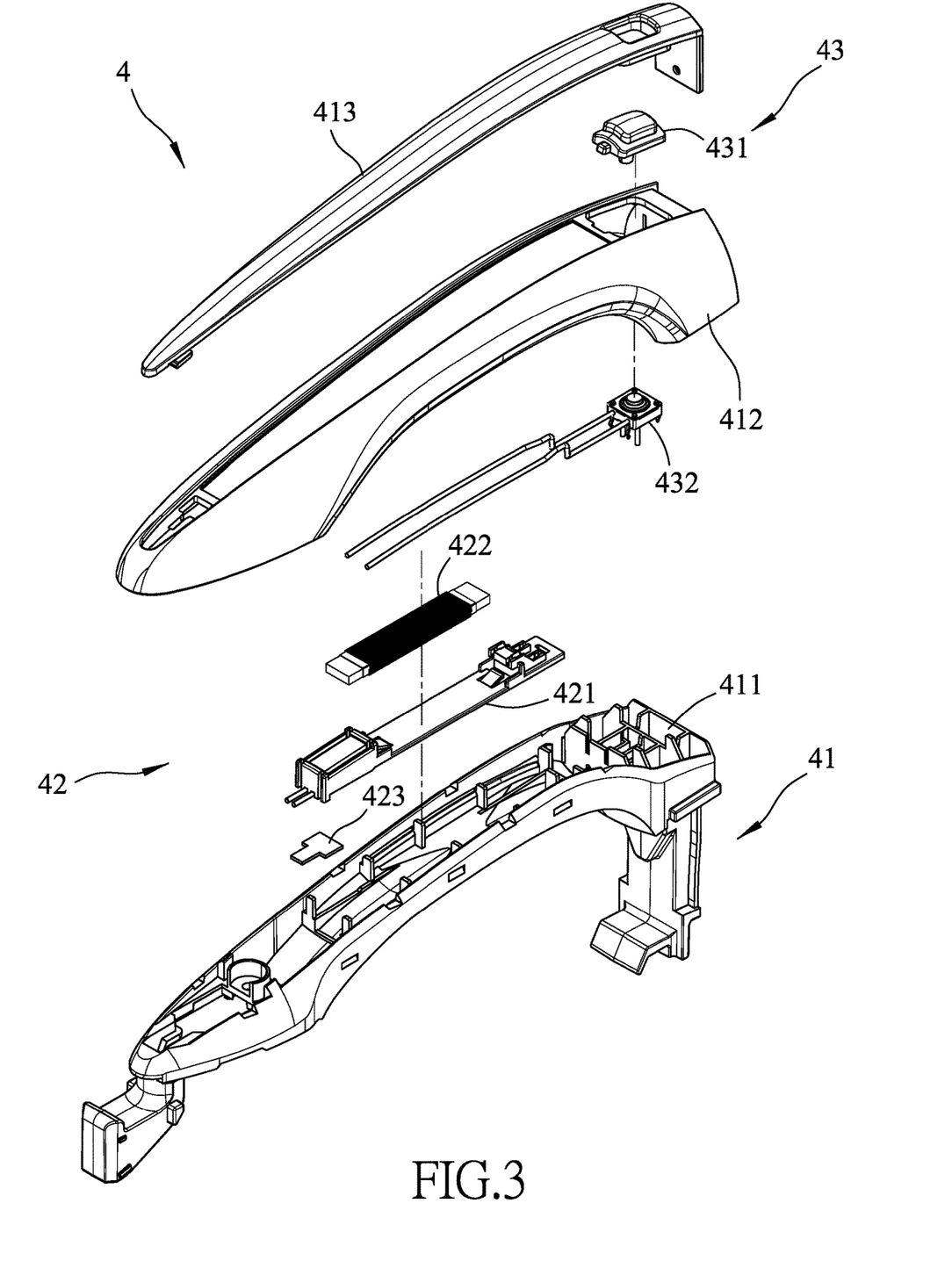
FIG. 3 is an exploded perspective view illustrating an embodiment of a door handle of the vehicle lock control system.
Figure 4:
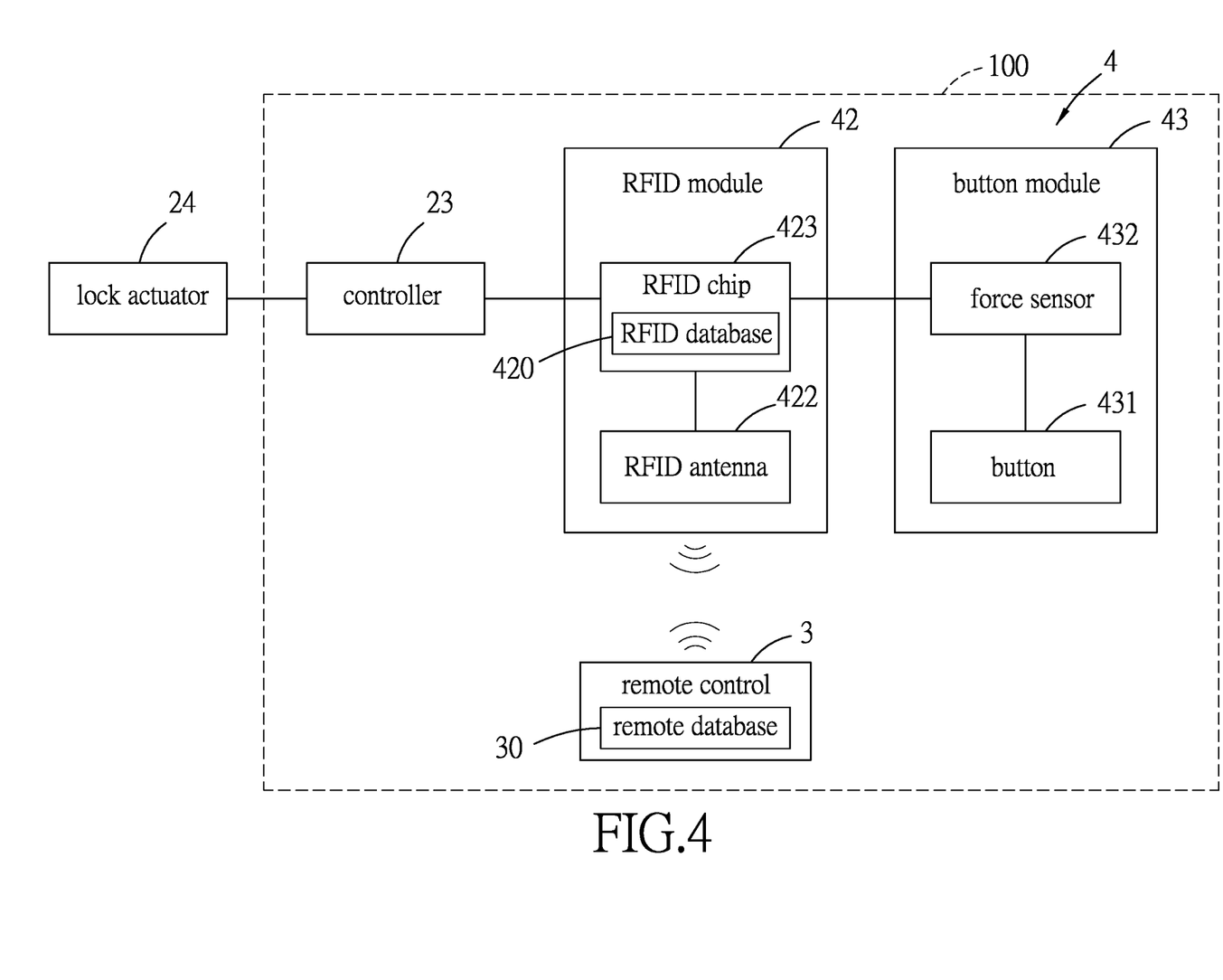
FIG. 4 is a block diagram of the vehicle lock control system.

Referring to FIGS. 2 to 4, one embodiment of a vehicle lock control system 100 for a vehicle 2 according to this disclosure includes a controller 23, a remote control 3 and a door handle 4. The vehicle 2 includes a door 22, and a lock actuator 24 that is mounted to the door 22 at a position close to the door handle 4. The lock actuator 24 is well-known in the art and not a feature of this disclosure, and is to be understood as a component switchable between a locking position and an unlocking position.

The controller 23 is disposed in the vehicle 2 and is electrically connected to the lock actuator 24. The controller 23 is configured to store a pre-stored identification (ID) code. The controller 23 may be referred to as "main unit" in the field of automobiles.

The remote control 3 is typically carried by a user (i.e., a driver of the vehicle 2), and is used to provide a function of remotely controlling the controller 23 within a predetermined distance. The remote control 3 stores a remote ID code which is an unique security code. For example, the remote ID code is burned or programmed in the remote control 3 by a manufacturer of the remote control 3. The remote control 3 includes a remote database 30 that stores a plurality of reporting codes. This will be discussed below in greater detail.

The door handle 4 is mounted on the door 22 of the vehicle 2, and includes a handle body 41, a radio frequency identification (RFID) module 42 and a button module 43.

The handle body 41 includes an inner case 411 mounted on the door 22 and connected to the lock actuator 24, a outer case 412 connected to the inner case 411 to cooperatively define a space therebetween, and a handle panel 413 covered on the outer case 412.

The RFID module 42 is disposed in the handle body 41, is electrically connected to the controller 23, and is configured to communicate with the remote control 3 using RFID technology. Specifically, the RFID module 42 includes a substrate 421, an RFID chip 423 configured to store and process information and to modulate and demodulate signals, and an RFID antenna 422. Both the RFID chip 423 and the RFID antenna 422 are mounted on the substrate 421, and the whole RFID module 42 is disposed in the space between the inner case 411 and the outer case 412 of the handle body 41.

In this embodiment, the RFID chip 423 consists of electronic components, e.g., a transistor, a resistor, an inductor, a capacitor, etc. When configuration of the RFID chip 423 is changed (for example, any component of the RFID chip 423 is changed), a radio frequency modulated by the RFID chip 423 changes. The RFID antenna 422 is configured to communicate with the remote control 3 over the radio frequency.

Further, the RFID chip 423 includes an RFID database 420 storing a plurality of querying codes. For example, the RFID database 420 may store thousands of querying codes in practice. The querying codes correspond respectively to the reporting codes stored in the remote database 30 of the remote control 3, and this will be discussed below in greater detail.

The button module 43 is disposed on the handle body 41, and is electrically connected to the RFID module 42. Specifically, the button module 43 includes a button 431 embedded in and exposed from the outer case 412, and a force sensor 432 that is disposed at an inner side of the button 431 and that is sandwiched between the inner case 411 and the outer case 412. The force sensor 432 is electrically connected to the RFID chip 423 of the RFID module 42. It should be noted that the term "inner side" is determined in a general sense when the door handle 4 is mounted on the door 2 (i.e., the closer to the inside of the vehicle 2, the more "inner").

Figure 5:
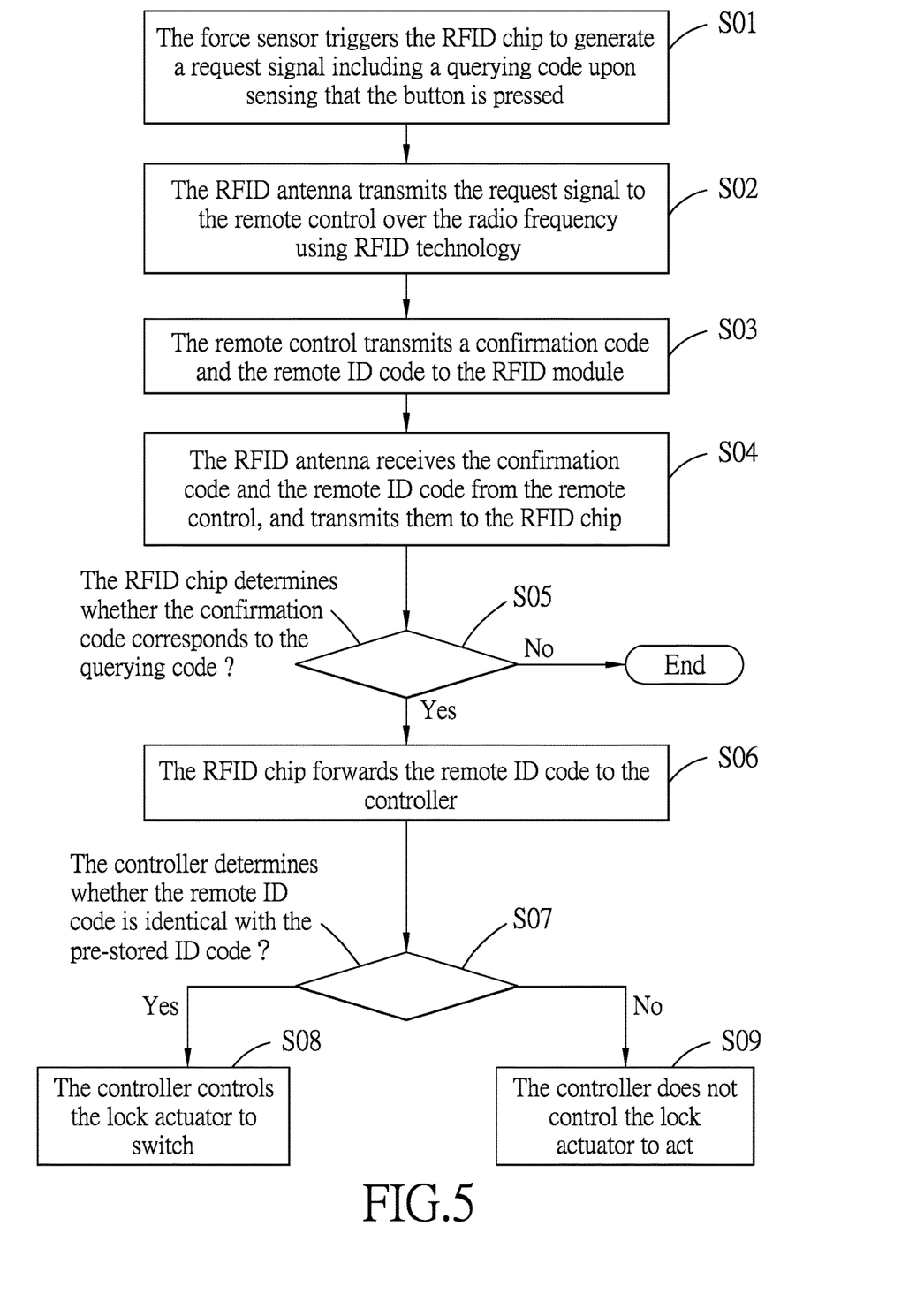
FIG. 5 is a flow chart illustrating an embodiment of an operation method of the vehicle lock control system according to an embodiment of the disclosure.

Further referring to FIG. 5, an operation method of the vehicle lock control system 100 includes the following steps.

In step S01, upon sensing that the button 431 is pressed, the force sensor 432 triggers the RFID chip 423 to randomly select one of the querying codes from the RFID database 420, and to generate a request signal including the querying code that is selected.

That is to say, in this embodiment, the querying code in the request signal is different every time the RFID chip 423 is triggered to generate the request signal. It is noted that, in other embodiments, the querying code to be included in the request signal may be a specific one of the querying codes stored in the RFID database 420 for a predetermined period of time, and be changed randomly by randomly selecting another one of the querying codes from the RFID database 420 after the predetermined period of time has elapsed.

In step S02, the RFID antenna 422 transmits the request signal to the remote control 3 over the radio frequency using RFID technology.

In step S03, in response to receipt of the request signal, the remote control 3 generates and transmits to the RFID module 42 a reply signal including a confirmation code and the remote ID code.

Specifically, the remote control 3 selects from the remote database 30 one of the reporting codes that corresponds to the querying code of the request signal to serve as the confirmation code, and generates the reply signal including the confirmation code. In a case that the remote control is fake (unauthorized), the fake remote control may not have a database storing the reporting codes that correspond respectively to the querying codes and would thus not be able to find a confirmation code corresponding to the querying code in the request signal.

In step S04, the RFID antenna 422 receives the reply signal from the remote control 3, and transmits it to the RFID chip 423.

In step S05, the RFID chip 423 determines whether the confirmation code included in the reply signal corresponds to the querying code that is included in the request signal generated in step S01. The process goes to step S06 when the determination made in this step is affirmative, and the method terminates when otherwise. In some embodiments, the RFID chip 423 may transmit a signal in order for the controller 23 to control an alarm (not shown) to output an alert (e.g., a warning sound) (step S09) when it is determined in step S05 that the confirmation code included in the reply signal does not correspond to the querying code that is included in the request signal or when the reply signal does not include a confirmation code.

In step S06, the RFID chip 423 forwards the remote ID code to the controller 23.

In some embodiments, the remote control 3 may transmit only the confirmation code to the RFID module 42 in response to receipt of the request signal in step S03, in which case the RFID antenna 422 receives the confirmation code from the remote control 3 and transmits it to the RFID chip 423 in step S04, and the RFID chip 423 further generates and transmits a confirmation signal to the remote control 3 through the RFID antenna 422 when it is determined in step S05 that the confirmation code corresponds to the querying code in the request signal, and it is only when the remote control 3 receives the confirmation signal that the remote control 3 transmits the remote ID code to the RFID module 42, so the RFID chip 423 can forward the remote ID code to the controller 23 in step S06 upon receiving the same from the remote control 3 through the RFID antenna 422.

In step S07, the controller 23 determines whether the remote ID code received from the RFID chip 423 is identical with the pre-stored ID code. When it is determined that the remote ID code is identical with the pre-stored ID code, it means that the remote control 3 is authorized, and the process goes to step S08; otherwise, it means that the remote control 3 is unauthorized, and the process goes to step S09.

In step S08, the controller 23 controls the lock actuator 24 to switch from one of the locking position and the unlocking position to the other one of the locking position and the unlocking position. Specifically, in the case that the lock actuator 24 is in the locking position, the controller 23 controls the lock actuator 24 to switch to the unlocking position when it is determined that the remote ID code is identical with the pre-stored ID code, so that the door 22 is unlocked and can be opened by pulling the door handle 4. In the case that the lock actuator 24 is in the unlocking position, the controller 23 controls the lock actuator 24 to switch to the locking position when it is determined that the remote ID code is identical with the pre-stored ID code, so that the door 22 is locked and cannot be opened by pulling the door handle 4.

In step S09, the controller 23 does not control the lock actuator 24 to act (switch). Furthermore, the controller 23 may control the alarm to output the alert.

In summary, the door handle 4 of the vehicle lock control system 100 generates and transmits to the remote control 3 the request signal including the querying code that may be varying. Further, only when the confirmation code corresponds to the querying code does the RFID chip 423 forward the remote ID code received from the remote control 3 to the controller 23 in order for the controller 23 to determine whether the remote control 3 is authorized and to control the lock actuator 24.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A vehicle lock control system for a vehicle, the vehicle including a door and a lock actuator switchable between a locking position and an unlocking position, said vehicle lock control system comprising:
   a controller configured to store a pre-stored identification (ID) code;
   a remote control storing a remote ID code; and
   a door handle adapted to be mounted on the door of the vehicle, and including a handle body,
   a radio frequency identification (RFID) module disposed in said handle body, electrically connected to said controller, and configured to communicate with said remote control using RFID technology, and
   a button module disposed on said handle body, electrically connected to said RFID module, and configured to trigger said RFID module to generate and transmit a request signal including a querying code to said remote control upon being pressed,
   wherein said remote control is configured to transmit a confirmation code and the remote ID code to said RFID module after receiving the request signal, and said RFID module is further configured to determine whether the confirmation code corresponds to the querying code and to forward the remote ID code to said controller when it is determined that the confirmation code corresponds to the querying code,
   wherein said controller is configured to determine whether the remote ID code received from said RFID module is identical with the pre-stored ID code, and to control the lock actuator to switch from one of the locking position and the unlocking position to the other one of the locking position and the unlocking position when it is determined that the remote ID code is identical with the pre-stored ID code.

2. The vehicle lock control system of claim 1, wherein said RFID module includes an RFID chip configured to generate the request signal, and an RFID antenna configured to transmit the request signal.

3. The vehicle lock control system of claim 2, wherein said RFID chip includes an RFID database storing a plurality of querying codes, and is configured to randomly select one of the plurality of querying codes from said RFID database and to generate the request signal including the selected one of the plurality of querying codes, wherein said remote control includes a remote database storing a plurality of reporting codes that correspond respectively to the plurality of querying codes, and is configured to select from said remote database one of the plurality of reporting codes that corresponds to the querying code in the request signal to serve as the confirmation code.

4. The vehicle lock control system of claim 1, wherein said remote control is configured to transmit only the confirmation code to said RFID module in response to receipt of the request signal, said RFID module is configured to generate and transmit a confirmation signal to said remote control when it is determined that the confirmation code corresponds to the querying code in the request signal, and said remote control is further configured to transmit the remote ID code to said RFID module after receiving the confirmation signal from said RFID module.

5. The vehicle lock control system of claim 2, wherein said RFID chip is configured to modulate a radio frequency, and said RFID antenna is configured to communicate with said remote control over the radio frequency.

6. The vehicle lock control system of claim 1, wherein said handle body includes an inner case adapted to be mounted on the door and connected with the lock actuator, and an outer case covered on said inner case, wherein said RFID module is disposed between said inner case and said outer case.

7. The vehicle lock control system of claim 6, wherein said button module includes:
a button that is embedded in and exposed from said outer case; and
a force sensor that is disposed inside said button and is sandwiched between said inner case and said outer case, said force sensor electrically connected to said RFID module and configured to trigger said RFID module to generate and transmit the request signal to said remote control upon sensing that said button is pressed.

8. A door handle adapted to be mounted on a door of a vehicle, configured to cooperate with a controller that is provided in the vehicle and that stores a pre-stored ID code, and a remote control that stores a remote ID code, said door handle comprising:
a handle body;
an RFID module disposed in said handle body, electrically connected to the controller, and configured to communicate with the remote control using RFID technology, and
a button module disposed on said handle body, electrically connected to said RFID module, and configured to trigger said RFID module to generate and transmit a request signal including a querying code to the remote control upon being pressed, in order for the remote control to transmit a confirmation code and the remote ID code to said RFID module after receiving the request signal,
wherein said RFID module is further configured to determine whether the confirmation code corresponds to the querying code, to forward the remote ID code to the controller when it is determined that the confirmation code corresponds to the querying code, in order for the controller to determine whether the remote ID code received from said RFID module is identical with the pre-stored ID code, and to control the lock actuator to switch from one of the locking position and the unlocking position to the other one of the locking position and the unlocking position when it is determined that the remote ID code is identical with the pre-stored ID code.

9. The door handle of claim 8, wherein said RFID module includes an RFID chip configured to generate the request signal, and an RFID antenna configured to transmit the request signal.

10. The door handle of claim 9, wherein the remote control including a remote database storing a plurality of reporting codes wherein said RFID chip includes an RFID database storing a plurality of querying codes, and is configured to randomly select one of the plurality of querying codes from said RFID database and to generate the request signal to include the selected one of the plurality of querying codes; and wherein the plurality of reporting codes stored in the remote database correspond respectively to the plurality of querying codes, and the remote control selects from the remote database one of the plurality of reporting codes that corresponds to the querying code in the request signal to serve as the confirmation code.

11. The door handle of claim 8, wherein the remote control transmits only the confirmation code to said RFID module in response to receipt of the request signal, and said RFID module is configured to generate and transmit a confirmation signal to the remote control when it is determined that the confirmation code corresponds to the querying code in the request signal, in order for the remote control to further transmit the remote ID code to said RFID module after receiving the confirmation signal from said RFID module.

12. The door handle of claim 9, wherein said RFID chip is configured to modulate a radio frequency, and said RFID antenna is configured to communicate with the remote control over the radio frequency.

13. The door handle of claim 8, wherein said handle body includes an inner case adapted to be mounted on the door, and an outer case covered on said inner case and connected with the lock actuator, wherein said RFID module is disposed between said inner case and said outer case.

14. The door handle of claim 13, wherein said button module includes:
a button that is embedded in and exposed from said outer case; and
a force sensor that is disposed inside said button and that is sandwiched between said inner case and said outer case, said force sensor electrically connected to said RFID module and configured to trigger said RFID module to generate and transmit the request signal to the remote control upon sensing that said button is pressed.

15. An operation method of a vehicle lock control system for a vehicle, the vehicle including a door and a lock actuator switchable between a locking position and an unlocking position, the vehicle lock control system including a controller that stores a pre-stored ID code, a remote control that stores a remote ID code, and a door handle that is mounted on the door and that includes a handle body, an RFID module disposed in the handle body, and a button module electrically connected to the RFID module, said method comprising steps of:

the RFID module generating and transmitting a request signal that includes a querying code to the remote control upon being triggered by the button module when the button module is pressed;

the remote control transmitting a confirmation code and the remote ID code to the RFID module after receiving the request signal;

the RFID module determining whether the confirmation code corresponds to the querying code and forwarding the remote ID code to the controller when it is determined that the confirmation code corresponds to the querying code;

the controller determining whether the remote ID code received from the RFID module is identical with the pre-stored ID code; and the controller controlling the lock actuator to switch from one of the locking position and the unlocking position to the other one of the locking position and the unlocking position when it is determined that the remote ID code is identical with the pre-stored ID code.

16. The operation method of claim 15, the RFID module including an RFID chip that is configured to generate the request signal and that has an RFID database storing a plurality of querying codes, the remote control including a remote database that stores a plurality of reporting codes which correspond respectively to the plurality of querying codes;

wherein said step of the RFID module generating and transmitting the request signal includes the RFID chip randomly selecting one of the plurality of querying codes from the RFID database to be included in the request signal; and wherein said step of the remote control transmitting the confirmation code and the remote ID code includes the remote control selecting from the remote database one of the plurality of reporting codes that corresponds to the querying code in the request signal to serve as the confirmation code.

17. The operation method of claim 15, wherein said step of the remote control transmitting the confirmation code and the remote ID code to the RFID module and said step of the RFID module determining whether the confirmation code corresponds to the querying code and forwarding the remote ID code to the controller include:

the remote control transmitting only the confirmation code to the RFID module in response to receipt of the request signal, the RFID module generating and transmitting a confirmation signal to the remote control when it is determined that the confirmation code corresponds to the querying code in the request signal, and the remote control transmitting the remote ID code to the RFID module after receiving the confirmation signal from the RFID module.

* * * * *